United States Patent [19]

Moisin

[11] Patent Number: 5,014,305
[45] Date of Patent: May 7, 1991

[54] LINE INTERFACE CIRCUIT

[75] Inventor: Mihail S. Moisin, Toronto, Canada

[73] Assignee: Northern Telecom Limited, Montreal, Canada

[21] Appl. No.: 530,483

[22] Filed: May 31, 1990

Related U.S. Application Data

[63] Continuation of Ser. No. 324,124, Mar. 16, 1989, abandoned.

[51] Int. Cl.$^5$ .............................................. H04B 1/58
[52] U.S. Cl. .................................... 379/402; 379/399; 379/413
[58] Field of Search ............... 379/377, 382, 399, 402, 379/405, 413, 106, 107

[56] References Cited

U.S. PATENT DOCUMENTS

| | | | |
|---|---|---|---|
| 3,300,558 | 1/1967 | Flowers | 379/399 |
| 4,087,647 | 5/1978 | Embree et al. | 379/413 |
| 4,103,112 | 7/1978 | Korsky | 379/382 |
| 4,358,643 | 11/1982 | Levy | 379/402 |
| 4,380,690 | 4/1983 | Matsufuji et al. | 379/402 |
| 4,500,755 | 2/1985 | Murto | 379/402 |
| 4,864,608 | 9/1989 | Moisin . | |

Primary Examiner—James L. Dwyer
Assistant Examiner—M. Shehata
Attorney, Agent, or Firm—J. E. Moorehouse

[57] ABSTRACT

A telephone line interface circuit includes a transformer with tip and ring windings connected between tip and ring feed resistors and tip and ring leads of a telephone line, for feeding energizing current from a telephone facility to the telephone line. A secondary winding in combination with the tip and ring windings couples a.c. signals between the facility and the telephone line. A capacitance device is connected in combination with the secondary winding to simulate a function of a capacitance device as would normally be connected between the tip and ring windings in prior art circuits. The telephone line interface circuit is particularly useful in association with battery reversal responsive telemetry devices as any tendency for false ringer activation, in a connected telephone set, is reduced.

4 Claims, 1 Drawing Sheet

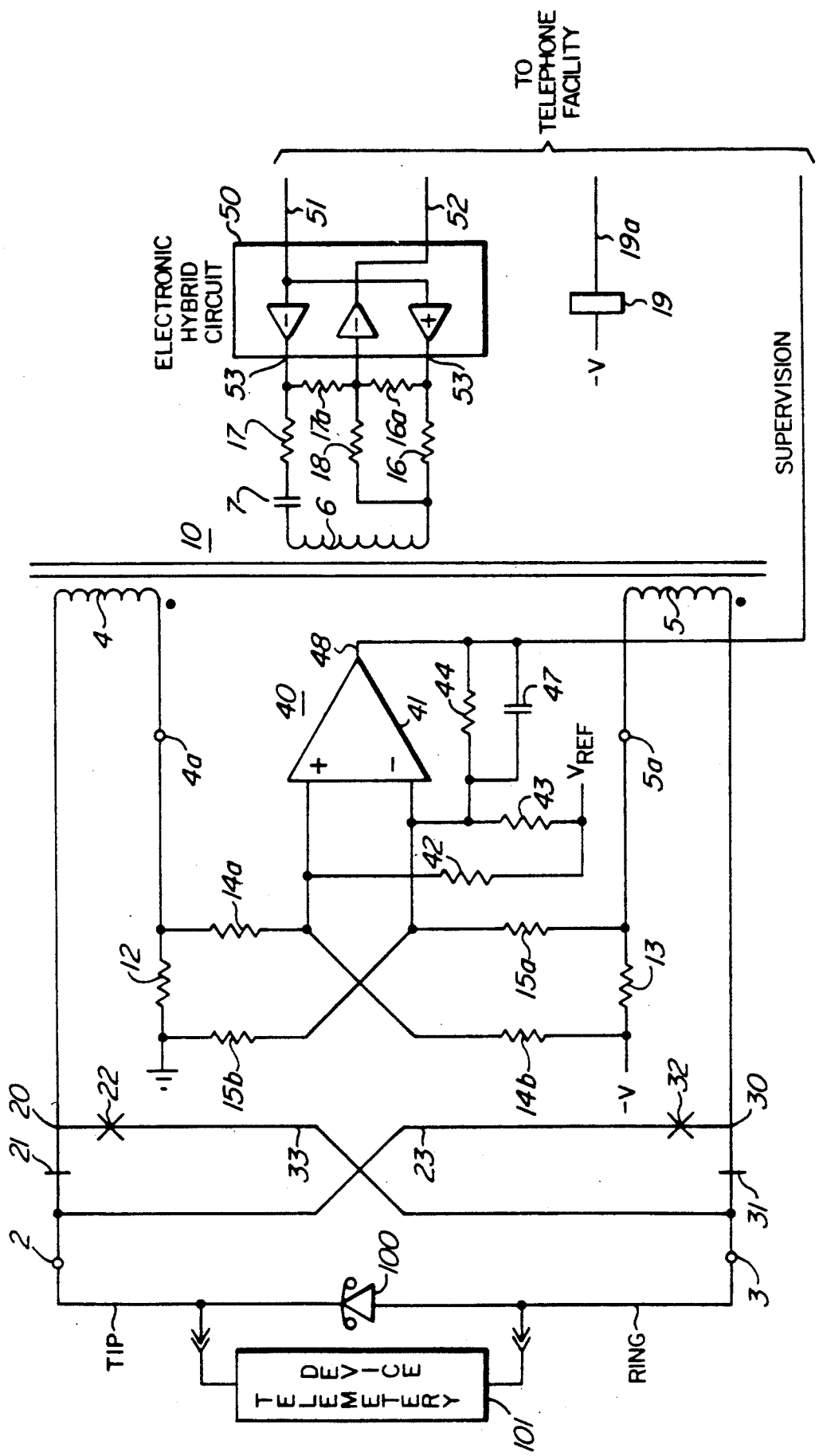

LINE INTERFACE CIRCUIT

This application is a continuation of application Ser. No. 324,124, filed 16 Mar. 1989, now abandoned in the name of Mihail Stefan Moisin and titled "Lined Interface Circuit".

INTRODUCTION

The invention is in the field of telephone and relates to line interface circuits for coupling energizing current to a telephone line and for coupling signals between the telephone line and an associated telephone facility.

BACKGROUND

In a typical telephone switching system, a line interface circuit is used to provide coupling to a subscriber telephone line served by the system. The line interface circuit usually comprises a transformer having a primary winding being split into equal halves for connection to tip and ring leads of the subscriber line and a secondary winding for connection to a hybrid circuit. Energizing direct current is supplied via tip and ring feed resistors and the split primary winding for operation of a telephone instrument or the like, connected at the far end of the telephone line. The line interface circuit may also include a tertiary winding, sometimes referred to as a balance winding, similar to that disclosed by V.V. Korsky in U.S. Pat. No. 4,103,112 issued on July 25, 1978. In any case the halves of the split primary winding are connected in series by a capacitance device, usually referred to as a capacitor which conducts a.c. signal currents. If it were not for the capacitor, the a.c. signal currents would otherwise have to traverse some other path, in this example the tip and ring feed resistors. In fact, some a.c. signal currents at the lower end of the voice band do traverse the tip and ring feed resistors because the conductance of the capacitor at these frequencies tends toward the conductances of the feed resistors. This is of deleterious effect to telephone line interface operation which is the subject of my U.S. Pat. No. 4,864,608 issued 5 Sept. 1989, also in the name of M.S. Moisin. The capacitance value of the capacitor is a critical factor in defining the terminating impedance of the line interface circuit. Therefore within an operating territory of any telephone company this capacitance value for any particular family of line interface circuit types is predetermined.

Recently, in some operating telephone companies, a telemetry service has been introduced whereby a metered measure, of a supplied commodity, is communicated from a subscriber's premise, to the supplier of the commodity via the telephone system. Such commodity may be water, gas, or electricity for example. In one such arrangement, telemetry equipment at the subscriber's premise is poled in response to a reversal of the polarity of the energizing current being applied at the line interface circuit This is simply accomplished by switching the tip and ring leads between the ends of the split primary winding of the transformer for a few seconds during which time it is intended that telemetry equipment has responded. Thereafter, the normal connection arrangement is restored.

Unfortunately, in many such arrangements, the accumulated charge, in the capacitor connected between the halves of the split primary winding, causes a current surge along the telephone line sufficient to induce a momentary operation of the ringer in the subscriber's telephone instrument. As telemetry is conveniently performed while the subscriber's station set is in an idle condition, it is therefore usually performed sometime during the first few hours following midnight, that is when telephones are least likely to be in use.

Heads are a nodding,
Sleep is a falling,
The witching hour draws neigh,
When a telephone tinkle,
From telemetric wrinkle,
Raises a red eyed insomniac's sigh.

Night after night,
Insomniac's plight,
Is repeated with frustrated cry;
Till with telephone gripped,
Revenge's cup sipped,
The instrument's hurled far and high.

Those telephone subscribers who are light sleepers, but nevertheless want to have a telephone nearby, can be disturbed by the initial tinkle of battery reversal, which is then followed a second or two later by a second tinkle, when the normal connection at the line interface circuit is restored.

SUMMARY OF THE INVENTION

It is an object of the invention to provide a resistance feed line interface circuit wherein offending accumulated charge is substantially avoided so that the incidence or intensity of false ringer response to switching of battery polarity is reduced.

It is also an object of the invention to provide a line interface circuit which is economically attractive for use in association with telephone switching facilities which are also employed in collection of telemetry data.

In accordance with tee invention, a line interface circuit for energizing tip and ring leads of a communication line with direct current from a power source and for coupling alternating current signals between the communication line and a hybrid circuit associated with a telephone facility, with a characteristic impedance substantially corresponding to a predetermined impedance comprises: tip and ring terminals for connection to the tip and ring leads; first and second battery terminals for connection to the power source; tip and ring feed resistors each connected to respective one of the battery terminals, the tip and ring feed resistors being of similar ohmic values; a transformer having tip and ring primary windings being connected in series between the tip terminal and the tip feed resistor and the ring terminal and the ring feed resistor respectively, said tip and ring primary windings so connected being poled such that a flow of energizing current is of a magnetically aiding effect in the transformer, the transformer also having a secondary winding for connection to the hybrid circuit; a resistive capacitive network being connected between the secondary winding and the hybrid circuit, and including, a capacitive reactance device connected to the secondary winding and being of a predetermined value, whereby voice band alternating currents in the primary winding are transformer coupled with a predetermined complex impedance, and a resistive element being connected serially with the capacitive reactance device and the hybrid circuit, and at least another resistive element being connected between the secondary winding and the hybrid circuit, the resistive elements being of values whereby the coupling of alternating current signals within a voice band range of frequencies is effected at said characteristic impedance.

Also in accordance with the invention, the line interface circuit further comprises: tip and ring voltage dividers connected in combination with the tip and ring feed resistors and including tip and ring voltage taps; a differential amplifier circuit including inputs connected to the tip and ring voltage taps, an output for providing supervisory signals for use in the telephone facility, and a feed back path connected between the output and an inverting one of the inputs of the differential amplifier, the feedback path including a resistor and a capacitor being connected in parallel for shaping rise and fall characteristics of ON HOOK, OFF HOOK and DIAL PULSE signals.

BRIEF DESCRIPTION OF THE DRAWING

The accompanying drawing is a schematic diagram of a line interface circuit in accordance with the invention.

DESCRIPTION

Referring to the drawing, a telephone instrument 100 is illustrated as being connected to a telephone facility (not shown) via tip and ring leads and the line interface circuit. The tip and ring leads are connected to tip and ring terminals 2 and 3. A transformer 10 includes tip and ring primary windings 4 and 5 which are connected between ground and negative polarity ($-V$) terminals of an office battery supply and the tip and ring terminals 2 and 3. Thus connected, battery voltage is normally applied across the telephone instrument such that when the telephone instrument 100 is in an OFF HOOK state, energizing direct current traverses tip and ring feed resistors 12 and 13, the tip and ring primary windings 4 and 5, BREAK contact portions 21 and 31 of tip and ring transfer contacts 20 and 30, the tip and ring terminals 2 and 3 and the tip and ring leads to operate the telephone instrument 100. The transformer 10 also includes a secondary winding 6 which is connected to an electronic hybrid circuit 50 via a resistive capacitive network which includes resistors 16, 16a, 17, 17a and a capacitive reactance device being provided by 18 and a capacitor 7, as shown. The secondary winding 6 is essential for providing a coupling for alternating current signals between the telephone facility and the telephone instrument 100. Alternating current signals traverse the same circuit elements as previously described in relation to the energizing direct current, with the exception of the feed resistors 12 and 13 which preferably do not have a.c. voice band signal voltages developed thereacross. Normally, in accordance with traditional design of line interface circuits, points labeled 4a and 5a in the drawing are connected by a capacitive element which carries most of the a.c. signal energy between the tip and ring windings. However as previously discussed, this capacitance element has a tendency to cause brief ringer action in the telephone instrument 100 if the transfer contacts 20 and 30 are switched thereby reversing the polarity of the energizing current: supplied via the tip and ring terminals 2 and 3. Therefore an alternate solution is provided by a capacitor 7 connected in combination with the secondary winding 6 and in this example with resistors 16, 16a, 17, 17a and 18, whereby the impedance characteristic of the line circuit when measured at the tip and ring terminals appears to be equivalent to the impedance characteristic of 900 ohms resistance connected in series with 2.16 microfarads capacitance, in the voice band. The electronic hybrid circuit 50 is connected as shown such that the effective input impedance of the hybrid circuit 50 is determined by the values of the resistors 16a and 17a. In operation, the electronic hybrid circuit 50 functions to receive a.c. signals from the telephone facility via a receive path 51 and to transmit a.c. signals to the telephone facility via a transmit path 52. Signals from the receive path 51 are amplified and applied to the telephone line via a balanced voltage driving port 53 and the transformer 10.

Control of normal polarity and reverse polarity energizing of the communication line is effected by switching of transfer contacts 20 and 30 which are operated by a relay armature. The relay armature is symbolized at 19, and is controlled by the telephone facility. In the event that a telemetry device 101 is connected to the communication line, it is connected in parallel with the telephone instrument 100. An understanding of the operation of the telemetry device 101 is not pertinent to understanding the function of the line interface circuit. It is sufficient to assume that in the event that a battery reversal occurs, the telemetry device transmits whatever data it may have, via the telephone line. The data may be sent in any of various signal formats, some examples being, dial like pulse signalling, in band single frequency signalling, DTMF signalling, or frequency shift keying data signals. To activate the telemetry device 101, the telephone facility operates the transfer contacts 20 and 30 by grounding a lead 19a. This causes BREAK contact portions 21 and 31 to open, and thereafter MAKE contact portions 22 and 32 to close. Thus, energizing current is rerouted via leads 23 and 33 to effect a reversal of the battery polarity at the tip and ring terminals 2 and 3. This is achieved without incurring any significant current surge on the communication line, as the capacitor 7 is transformer isolated from the direct energizing current path.

The line circuit in the figure is intended to be a direct replacement for line circuits typically used in telephone switching facilities, and is intended to have no significant impact on any of the operations of same. Signalling and supervision is detected at the line circuit by the use of a differential amplifier circuit 40 which includes a differential amplifier 41 having inverting and non-inverting inputs, and an output 48. Resistor 42-44 are connected in the differential amplifier circuit 40, as shown. The inputs of the differential amplifier circuit 40 are connected across tip and ring voltage dividers, which are provided by resistors 14a, 14b, 15a and 15b, as shown. This arrangement is similar to that discussed in the previously mentioned patent to V.V. Korsky. This arrangement can also be utilized in combination with appropriate circuitry, not shown, to provide magnetic flux cancellation as is preferred in many present day line interface circuits. A capacitor 47 is connected with the resistor 44 to simulate rise and fall characteristics of dial pulsing and ON HOOK, OFF HOOK state transitions, at the output 48, so that the supervisory signal characteristics are generally similar to those characteristics as they would be were a capacitor connected between the points 4a and 5a.

Component values convenient for construction of a line interface circuit in accordance with that illustrated in the drawing are listed in the following table.

| Component | Value |
| --- | --- |
| Resistors | |
| 12, 13 | 200 Kohms |
| 14a, 14b, 15a, 15b | 300 Kohms |
| 16 | 450 Ohms |
| 16a | 300 Kohms |
| 17 | 450 Ohms |
| 17a | 300 Kohms |
| 18 | 10 Kohms |
| 42 | 5.08 Kohms |
| 43 | 8 Kohms |
| 44 | 14 Kohms |
| Capacitor | |
| 7 | 2.16 microfarads |
| 47 | .033 microfarads |

I claim:

1. A line interface circuit for energizing tip and ring leads of a communication line with direct current from a power source and for coupling alternating current signals between the communication line and a hybrid circuit associated with a telephone facility, with a characteristic impedance substantially corresponding to a predetermined impedance comprising:

tip and ring terminals for connection to the tip and ring lead;

first and second battery terminals for connection to the power source;

tip and ring feed resistors each connected to respective one of the battery terminals, the tip and ring feed resistors being of similar ohmic values;

a transformer having tip and ring primary windings being connected in series between the tip terminal and the tip feed resistor and the ring terminal and the ring feed resistor respectively, said tip and ring primary windings so connected being poled such that a flow of energizing current is of a magnetically aiding effect in the transformer, the transformer also having a secondary winding for connection to the hybrid circuit;

a resistive capacitive network being connected between the secondary winding and the hybrid circuit, and including, a capacitive reactance device connected to the secondary winding and being of a predetermined value, whereby voice band alternating currents in the primary winding are transformer coupled with a predetermined complex impedance, and a resistive element being connected serially with the capacitive reactance device and the hybrid circuit, and at least another resistive element being connected between the secondary winding and the hybrid circuit, the resistive elements being of values whereby the coupling of alternating current signals within a voice band range of frequencies is effected at said characteristic impedance.

2. A line interface circuit as defined in claim 1 further comprising:

a switch means connected between the tip and ring terminals and the primary windings, and being operable for reversing the polarity of the energizing direct current normally applied to the communication line.

3. A line interface circuit as defined in claim 2 wherein the switch means comprises:

tip and ring transfer contacts each connected in series between a respective one of the tip and ring terminals and the primary windings.

4. A line interface circuit as defined in claim 1 further comprising:

tip and ring voltage dividers connected in combination with the tip and ring feed resistors and including tip and ring voltage taps;

a differential amplifier circuit including inputs connected to the tip and ring voltage taps, an output for providing supervisory signals for use in the telephone facility, and a feed back path connected between the output and an inverting one of the inputs of the differential amplifier, the feedback path including a resistor and a capacitor being connected in parallel for shaping rise and fall characteristics of ON HOOK, OFF HOOK and DIAL PULSE signals.

* * * * *